Figure 1:
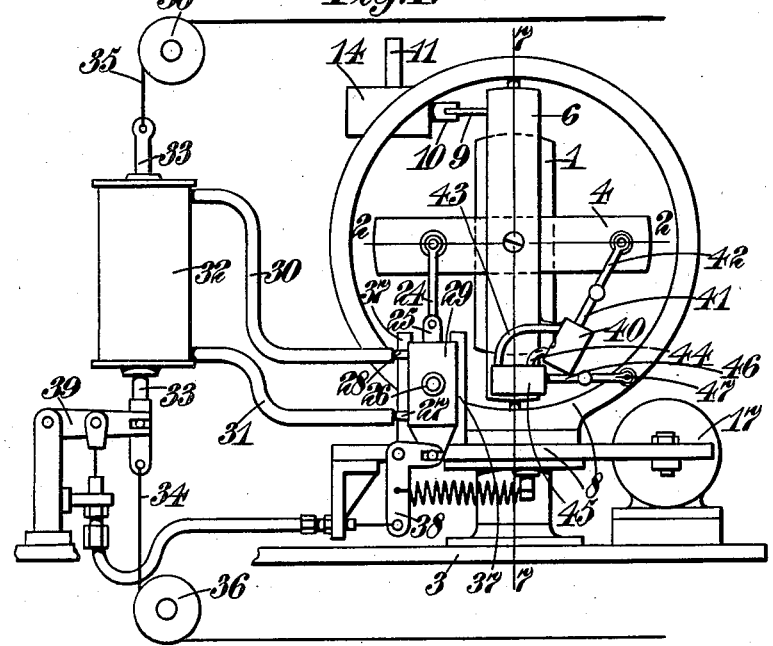

Oct. 6, 1931.   F. W. MEREDITH   1,826,013
GYROSCOPIC CONTROL SYSTEM FOR DIRIGIBLE CRAFT
Filed Aug. 18, 1930   2 Sheets-Sheet 1

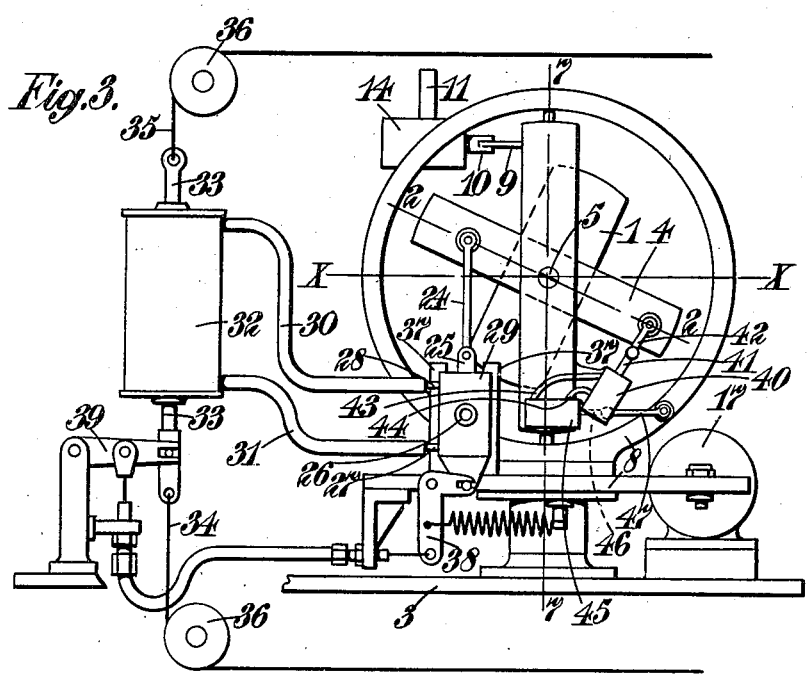

Patented Oct. 6, 1931

1,826,013

UNITED STATES PATENT OFFICE

FREDERICK WILLIAM MEREDITH, OF FARNBOROUGH, ENGLAND

GYROSCOPIC CONTROL SYSTEM FOR DIRIGIBLE CRAFT

Application filed August 18, 1930, Serial No. 476,107, and in Great Britain July 18, 1925.

This invention relates to automatic control systems for aeroplanes and like dirigible craft.

It has been proposed to employ a gyroscope having a horizontal axis of spin for controlling the rudder and to employ a second gyroscope having a vertical axis of spin for controlling the elevators and the ailerons.

According to one feature of the present invention, a single universally mounted gyroscope controls aerodynamically and independently or substantially independently both the steering and the pitching movement between the aeroplane and the rotor axis about two defined axes, the rotor axis being arranged in the fore and aft direction of the aeroplane.

According to another feature of the present invention a single gyroscope comprising a rotor possessing three axes of freedom and having the rotor axis arranged in the fore and aft direction of an aeroplane is employed to control aerodynamically both the steering and the pitching movements of the aeroplane.

According to another feature of the invention a single universally mounted gyroscope is arranged so that one gimbal ring controls the rudder or the steering movements of an aeroplane and the other gimbal ring controls the elevators or the pitching movements of the aeroplane. According to another feature of the invention a single universally mounted gyroscope is associated with means sensitive to relative movement between the azimuth ring and the gyroscope frame and a follow-up system for controlling a servomotor for operating the rudder, and with means sensitive to relative movement between the pitch ring and the gyroscope frame and a follow-up system for controlling a servomotor for operating the elevators, the whole arrangement being adapted to control both the steering and the pitching movements of an aeroplane.

In an aeroplane provided with an azimuth gyroscope to correct through a servomotor deviations from course by the application of rudder angle and with follow-up mechanism associated with the gyroscope and the servomotor to make the angular displacement of the rudder proportional or approximately so to the azimuthal disturbance of the aeroplane the lateral motion of the aeroplane generally consists of an oscillation, and the degree of damping of this oscillation is of importance and within limits may be increased by the operation of ailerons.

The present invention has for an object to provide a method of damping the lateral motion due to application of rudder angle by an azimuth gyroscope associated with follow-up mechanism apart from the operation of ailerons.

According to one feature of the present invention, in a gyroscopic system wherein an azimuth gyroscope is associated with a servomotor and follow-up gear as aforesaid, the damping of the lateral motion is improved by applying rudder angle determined by the displacement in roll of the aeroplane relative to a free gyroscope rotor axis. The rudder angle is caused to be the sum of two parts, one part being determined by the angle through which the aeroplane has turned off its course and the other being determined by the angle to which the aeroplane is banked.

Figure 2:
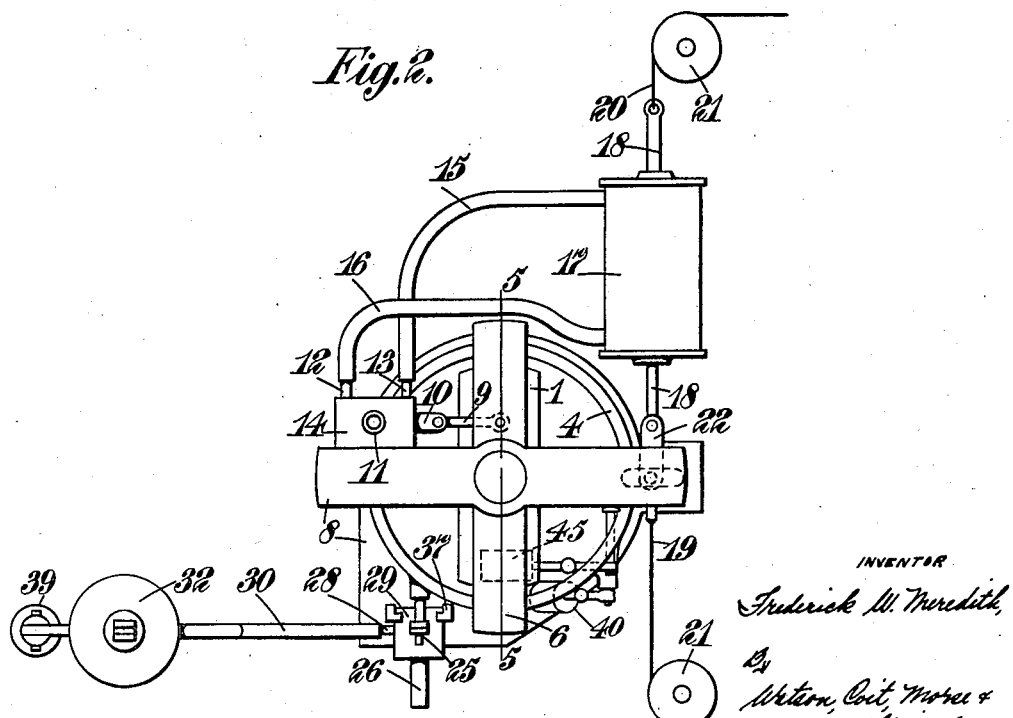

Figures 1 and 2 are respectively an elevation and a plan of a universally mounted gyroscope for controlling both the steering and the pitching movements of an aeroplane, and Figure 3 is an elevation showing a modification in which the rotor axis is tilted.

As shown in Figures 1 and 2, the gyroscope comprises a rotor 1 having its axis of spin 2—2 arranged horizontally in the fore-and-aft direction of the aeroplane 3 and mounted in an inner gimbal ring or pitch ring 4. The pitch ring 4 has its axis of pitch 5—5 arranged horizontally athwartship of the aeroplane and mounted in an outer gimbal ring or azimuth ring 6. The azimuth ring 6 has its axis of orientation 7—7 arranged vertically and mounted in a frame 8.

The rotor is driven by compressed air nozzles (not shown) to which compressed air is supplied through the lower trunnion mounting of the azimuth ring 6, but any other suitable driving means may be employed.

The gyroscope is used to control the rudder of the aeroplane by coupling the azimuth ring by means of a link 9 to a sensitive piston valve 10 controlling a compressed air inlet port 11 and outlet ports 12, 13 in a casing 14 fast on the frame 8. The inlet and outlet ports communicate by flexible conduits 15, 16 with the respective ends of a servomotor cylinder 17 fast on the aeroplane and containing a double acting piston. The piston rod 18 of the servomotor is connected to the rudder control cables 19, 20 for operating the rudder. 21 are guide pulleys. In the operation of the arrangement, relative movement in azimuth between the azimuth ring and the frame causes the valve 10 to open one end of its servomotor cylinder to the compressed air supply and the other end to exhaust so as to apply rudder angle. In order to obtain a follow-up effect, in which the movement of the rudder is proportional to the displacement of the azimuth ring, the frame 8 carrying the casing is pivotally mounted on the aeroplane and is connected to the piston rod 18 by a link 22.

The gyroscope is used to control the elevators by coupling the pitch ring by means of a link 24 to a sensitive piston valve 25 controlling a compressed air inlet port 26 and outlet ports 27, 28 in a casing 29 slidably mounted on the frame 8. The outlet ports communicate by means of flexible conduits 30, 31 with the respective ends of a servomotor cylinder 32 fast on the aeroplane 3 and containing a double acting piston. The piston rod 33 of this servomotor is connected to the elevator control cables 34, 35 for operating the elevators. 36 are guide pulleys. In the operation of the arrangement, relative movement between the pitch ring and the frame causes the valve 25 to open one end of the servomotor cylinder 32 to compressed air and the other end to exhaust, so as to apply elevator angle. In order to obtain a follow-up effect, in which the movement of the elevators is proportional to the displacement of the pitch ring, the casing 29 is slidably mounted in vertical guides 37 on the frame 8 and is connected to the piston rod 33 by Bowden wire or the like mechanism 38, 39.

The control system according to the invention is particularly intended to be applied to an aeroplane which may be flown without aileron control.

In the arrangement shown in Figures 1 and 2 rolling movement of the aeroplane about its longitudinal axis would result in the pitch ring rotating about the rotor axis and there will be no movement between the pitch ring and the azimuth ring or between the azimuth ring and the frame 8. In the arrangement shown in Figure 3 the pitch ring is tilted so that the axis of spin 2—2 of the rotor is tilted with respect to the longitudinal axis of the aeroplane x—x which is also the line of flight. In other respects the arrangement shown in Figure 3 is similar to that shown in Figures 1 and 2.

The effect of tilting the axis of spin of the rotor is as follows:

If the aeroplane rolls about its longitudinal axis x—x, that is, if the aeroplane banks, the resulting movement of the rotor axis cannot be accommodated entirely by rotation of the pitch ring about the rotor axis but is accommodated partly by such rotation and partly by rotation of the azimuth ring about its axis of orientation. The azimuth ring will thus be turned relatively to the frame and will bring the servomotor 17 into action through the agency of the piston valve 10. The servomotor will thus apply the rudder. The effect of this application of the rudder when the aeroplane banks is to increase the lateral stability provided that the aeroplane is so constructed that side-slip produces a stable rolling moment. Thus in the arrangement shown in Figure 3 the movement of the servomotor and the rudder is proportional to the relative movement between the azimuth ring and the frame 8 which in turn is the sum of two parts, one being determined by the angle though which the aeroplane has turned off its course and the other part being determined by the angle to which the aeroplane is banked. To determine the amount of movement of the azimuth ring due to the aeroplane rolling, the rotation of the rotor axis about the line of flight may be resolved into a component about the rotor axis which has no effect on the control of the aeroplane and a component about the azimuth axis.

In both the modifications illustrated any convenient anti-topple mechanism may be provided for countering the inherent tendency of the gyroscope to precess. As shown, the anti-topple mechanism comprises a piston valve 40 mounted on the azimuth ring and in communication with a source of compressed air through the lower trunnion bearing of the azimuth ring. The piston 41 of the valve is connected by a link 42 to the pitch ring. Opposite ends of the valve are connected by conduits 43, 44 to opposite ends of a small air motor 45 which is mounted on the azimuth ring. The piston rod 46 of the servomotor is connected by a link 47 to the frame 8. When the pitch ring moves relatively to the azimuth ring it moves the valve piston 41 so as to place one end of the servomotor 45 under pressure and open the other end to exhaust. The servomotor then applies a torque to the azimuth ring so as to cause the pitch ring to move towards its normal position, as shown in Figure 1 or in Figure 3. The servomotor 45 is a small motor relatively to the servomotors 17 and 32 so that it can only rotate the pitch ring slowly. The servomotor 45 thus will not materially affect movement of the pitch ring relatively to the azimuth frame when the aeroplane alters its angle of climb and thus will not prevent the pitch ring from applying the elevator to correct the alteration in the angle of climb. The servomotor is, however, large enough to deal with the slow precessions arising from friction of the bearings in the gyroscope and the rotation of the earth.

In place of using the anti-topple device illustrated the gyroscope may be arranged as described in the co-pending application of Cooke, Serial No. 476,099, filed August 18, 1930, which describes means for counting inherent precessions in the gyroscope, for altering course and for altering the angle of climb.

I claim:—

1. A gyroscopic control system for a dirigible craft moving in a fluid medium, comprising an azimuth gyroscope having its axis of spin arranged in the direction of the length of the craft but inclined to the longitudinal axis of the craft in a substantially vertical plane, a servomotor for actuating the rudder of the craft in accordance with relative turning movement of the longitudinal axis of the craft and the axis of spin about an erect axis, and a second servomotor for actuating the elevator plane of the craft in accordance with relative turning movement of the longitudinal axis of the craft and the axis of spin about a transverse axis.

2. A gyroscopic control system for a dirigible craft moving in a fluid medium comprising an azimuth gyroscope having its axis of spin arranged in the direction of the length of the craft, a servomotor for actuating the rudder of the craft in accordance with relative turning movement of the longitudinal axis of the craft and the axis of spin about an erect axis, and anti-topple mechanism for maintaining the axis of spin inclined backwardly to the longitudinal axis of the craft.

3. A gyroscopic control system for a dirigible craft moving in a fluid medium, comprising a rotor, an inner gimbal ring, whereon the rotor is mounted to spin, an outer gimbal ring whereon the inner gimbal ring is mounted to turn, a frame whereon the outer gimbal ring is mounted to turn about an erect axis, a servomotor for actuating the rudder, a control device for the servomotor operatively connected to the frame and outer ring and actuated by relative turning movement between said parts, and anti-topple mechanism for maintaining the plane of the gimbal ring inclined backwardly about a transverse axis relatively to the plane containing the longitudinal and horizontal transverse axes of the craft.

4. A gyroscopic control system for a dirigible craft moving in a fluid medium, comprising a rotor, an inner gimbal ring whereon the rotor is mounted to spin about an axis extending in the direction of the length of the craft, an outer gimbal ring whereon the inner ring is mounted to turn about a transverse axis, a frame whereon the outer ring is mounted to turn about an erect axis, a servomotor for actuating the rudder of the craft, a control device for the servomotor actuated by relative movement between the outer ring and the frame, a second servomotor and a control device for the second servomotor actuated by relative movement between the inner and outer rings.

5. A gyroscopic control system for a dirigible craft moving in a fluid medium, comprising a rotor, an inner gimbal ring whereon the rotor is mounted to spin about an axis extending in the direction of the length of the craft, an outer gimbal ring whereon the inner ring is mounted to turn about a transverse axis, a frame whereon the outer ring is mounted to turn about an erect axis, a servomotor for actuating the rudder of the craft, a differential control mechanism for the servomotor operatively connected to the outer ring and to the frame for actuation by relative movement of said parts and operatively connected to the servomotor for actuation thereby, a second servomotor for actuating the elevator, a differential control mechanism for the second servomotor operatively connected to the inner and outer rings for actuating by relative movement of said parts and operatively connected to the servomotor for actuation thereby.

6. A gyroscopic control system for a dirigible craft moving in a fluid medium, comprising a rotor, an inner gimbal ring whereon the rotor is mounted to spin about an axis extending in the direction of the length of the craft, an outer gimbal ring whereon the inner ring is mounted to turn about a transverse axis, a frame whereon the outer ring is mounted to turn about an erect axis, a servomotor for actuating the rudder of the craft, a differential control mechanism for the servomotor operatively connected to the outer ring and to the frame for actuation by relative movement of said parts and operatively connected to the servomotor for actuation thereby, and an anti-topple mechanism operatively connected to the inner and outer rings to restore the axis of spin of the rotor to a predetermined tilted position with respect to the longitudinal axis of the craft.

7. A gyroscopic control system for a dirigible craft moving a fluid medium, comprising a rotor, a universal mounting for the rotor whereby the rotor is supported to rotate normally about an axis fixed in the craft and extending in the direction of the length of the craft but inclined to the longitudinal axis of the craft in a substantially vertical plane, a device for actuating the rudder of the craft, an operative connection between said device and the rotor by which the rotor brings said device into action when its axis of rotation turns relatively to the fixed axis about an axis erect in the craft, a device for actuating the elevator of the craft and an operative connection between the second said device and the rotor by which the rotor brings said second device into action when its axis of rotation turns relatively to the fixed axis about an axis transverse to the length of the craft.

8. A gyroscopic control system for a dirigible craft moving in a fluid medium, comprising a single rotor, a universal mounting on which the rotor is supported to spin normally about a fixed axis extending in the direction of the length of the craft but inclined to the longitudinal axis of the craft in a substantially vertical plane, a detecting device for detecting turning movement of the axis of the spin of the rotor relative to the fixed axis about an erect axis, a relay mechanism for actuating the rudder of the craft, an operative connection between the detecting device and the relay mechanism by which the former controls the operation of the latter in accordance with the nature of said turning movement, a second detecting device for detecting turning movement of the axis of the spin of the rotor relative to the fixed axis about a transverse axis and a second relay mechanism for actuating the elevator of the craft and an operative connection between the second detecting device and the second relay mechanism by which said device controls the operation of said mechanism in accordance with the nature of said turning movement.

9. A gyroscopic control system for a dirigible craft moving in a fluid medium, comprising a single rotor, a universal mounting whereon the rotor is mounted to spin normally about an axis fixed in the craft, and extending in the direction of the length of the craft, but inclined to the longitudinal axis of the craft in a substantially vertical plane, mechanism for measuring turning movement of the axis of spin of the rotor relative to two defined axes in the craft, a servomotor for actuating the rudder of the craft a second servomotor for actuating the elevator of the craft, an operative connection between the measuring mechanism and the first servomotor by which the former controls the operation of the latter in accordance with the relative turning movement of the rotor axis about one of the defined axes, and an operative connection between the measuring mechnism and the second servomotor by which the former controls the operation of the latter in accordance with the relative turning movement of the rotor axis about the other defined axis.

10. A gyroscopic control system for a dirigible craft moving in a fluid medium, comprising a servomotor for actuating the rudder, a control device for bringing the servomotor into action to apply the rudder, a gyroscopic rotor, a universal mounting on which the rotor is mounted to spin normally about an axis fixed in, and extending in the direction of length of the craft but inclined to the longitudinal axis of the craft in a substantially vertical plane, an operative connection between the rotor and the control device by which the former actuates the latter to bring the servomotor into action in accordance with the turning movement of the rotor axis relative to the fixed axis about an erect axis, an operative connection between the servomotor and its control device by which the servomotor restores the control device to normal, a second servomotor for actuating the elevator of the craft, a second control device for bringing the second servomotor into action to adjust the elevator, an operative connection between the rotor and the second control device by which the former actuates the latter to bring the second servomotor into action in accordance with turning movement of the rotor axis relative to the fixed axis about an axis transverse to the craft, and an operative connection between the second servomotor and the second control device by which the said servomotor restores the said control device to normal.

11. A gyroscopic control system for a dirigible craft moving in a fluid medium, comprising a single gyroscopic rotor, two gimbal rings by which the rotor is universally mounted with its axis of spin extending in the direction of the length of the craft but inclined to the longitudinal axis of the craft in a substantially vertical plane, a relay mechanism for controlling the rudder of the craft, a second relay mechanism for controlling the elevator of the craft, an operative connection between one relay mechanism and one gimbal ring whereby the relay mechanism is controlled by the movement of said ring and an operative connection between the other relay mechanism and the other gimbal ring whereby the latter relay mechanism is controlled by the latter gimbal ring.

12. A gyroscopic control system for a dirigible craft moving in a fluid medium, comprising a gyroscopic rotor, two gimbal rings by which the rotor is universally mounted with its axis of spin extending in the direction of the length of the craft but incline to the longitudinal axis of the craft in a substantially vertical plane, a rudder actuating member, a reversible servomotor for driving said member, two control elements movable relatively to one another to determine whether, and in which direction the servomotor will drive said member, an operative connection between one of the control elements and one gimbal ring by which movement of said ring is imparted to the control element, an operative connection between one of the control elements and the rudder actuating member by which the movement of the latter is imparted to the former, an elevator actuating member, a second reversible servomotor for driving the elevator actuating member, two other control elements movable relatively to one another to determine whether, and in which direction, the servomotor is to drive the elevator actuating member an operative connection between one of said latter control elements and the other of said gimbal rings by which movement of the latter ring relative to the craft is imparted to the said control elements and an operative connection between one of said latter control elements and the elevator actuating member by which movement of said member is imparted to said control element.

13. A gyroscopic control system for a dirigible craft moving in a fluid medium, comprising a rotor a universal mounting by which the rotor is supported to spin normally about an axis extending in the direction of length of the craft but inclined to the longitudinal axis of the craft in a substantially vertical plane so that the forward end of the axis of spin is higher with respect to said longitudinal axis than is the rearward end of the axis of spin, a rudder actuating member, a servomotor for driving said member, a control device for the servomotor, an operative connection between the control device and rotor for bringing the control device into action when the axis of spin of the rotor turns relatively to the craft about an erect axis in the craft.

14. A gyroscopic control system for a dirigible craft moving in a fluid medium comprising a rotor, an inner gimbal ring in which the rotor is mounted, with its axis of spin normally extending in a vertical fore and aft plane of the craft, an azimuth ring in which the inner ring is mounted to turn about a horizontal axis transverse to the craft a frame wherein the azimuth ring is supported to turn about an erect axis, anti-topple mechanism operatively connecting the outer and inner rings and tending to maintain the inner ring tilted about its axis relatively to the said erect axis so that the fore end of the axis of spin of the rotor is uppermost, a device for detecting turning movement of the azimuth ring relatively to the frame about said erect axis, a rudder actuating member, a servomotor, a control device operable by said detecting device to bring the servomotor into action to drive said member in accordance with the directions of said turning movement, a device for measuring the movement of the rudder actuating member and operable to cause the control device to put the servomotor out of action when the movement of the rudder actuating movement is proportional to said turning movement of the azimuth ring.

In testimony whereof I have signed my name to this specification.

FREDERICK WILLIAM MEREDITH.